June 26, 1951 J. A. RAJCHMAN 2,558,460

SCANNING CIRCUIT FOR AREA SELECTION TUBES AND THE LIKE

Filed Oct. 11, 1946 7 Sheets-Sheet 1

Inventor

Jan A. Rajchman

By C. D. Tuska

Attorney

June 26, 1951 J. A. RAJCHMAN 2,558,460

SCANNING CIRCUIT FOR AREA SELECTION TUBES AND THE LIKE

Filed Oct. 11, 1946 7 Sheets-Sheet 2

Inventor
Jan A. Rajchman

By C. D. Tuska

Attorney

June 26, 1951 J. A. RAJCHMAN 2,558,460

SCANNING CIRCUIT FOR AREA SELECTION TUBES AND THE LIKE

Filed Oct. 11, 1946 7 Sheets-Sheet 3

Inventor
Jan A. Rajchman
By
C. D. Tuska
Attorney

SCANNING CIRCUIT FOR AREA SELECTION TUBES AND THE LIKE

Filed Oct. 11, 1946 7 Sheets-Sheet 4

Inventor
Jan A. Rajchman
By
C. D. Tuska
Attorney

Inventor
Jan A. Rajchman
By
[signature]
Attorney

June 26, 1951 J. A. RAJCHMAN 2,558,460

SCANNING CIRCUIT FOR AREA SELECTION TUBES AND THE LIKE

Filed Oct. 11, 1946 7 Sheets-Sheet 6

Inventor
Jan A. Rajchman
By C. D. Tuska
Attorney

June 26, 1951 J. A. RAJCHMAN 2,558,460

SCANNING CIRCUIT FOR AREA SELECTION TUBES AND THE LIKE

Filed Oct. 11, 1946 7 Sheets-Sheet 7

Inventor

Jan A. Rajchman

By Morris A. Rakin

Attorney

Patented June 26, 1951 2,558,460

UNITED STATES PATENT OFFICE 2,558,460

SCANNING CIRCUIT FOR AREA SELECTION TUBES AND THE LIKE

Jan A. Rajchman, Princeton, N. J., assignor to Radio Corporation of America, a corporation of Delaware Application October 11, 1946, Serial No. 702,775

16 Claims. (Cl. 315—21)

This invention relates to methods of and means for scanning an electron target in an electron discharge device of the area selection type. Such a device utilizes a plurality of angularly related grid wires which are adapted to be individually energized by control potentials so as to open and close selected apertures or electron gates which are continuously bombarded by electrons so as to permit electrons to flow through one or more of the apertures. A co-pending application of J. A. Rajchman, Serial No. 665,031, filed April 26, 1946, for improvements in Electron Discharge Devices, now Patent No. 2,494,670 issued January 17, 1950, describes and claims a discharge device of this type which has the ability to select instantly any one of a very large number of apertures, and thus to select the particular area on a target electrode which is to be impinged by electrons.

From an operational point of view, there are two basic types of control which may be utilized in an area selection tube, alternatively, (*a*) deflection, and (*b*) potential barrier. The former utilizes a cathode of conventional construction and a grid mesh which consists of two grid networks, each comprising a plurality of spaced, parallel grid wires, the wires of both networks being substantially perpendicular to the path of the electrons while being mutually at an angle one with respect to the other so as to form by their intersection windows through any one or more of which electrons may pass successively to the target electrode. The target electrode may comprise a dielectric surface and such other elements as are necessary to form a memory element, or a fluorescent screen may be utilized, or a combination of both. The grid wires of each network, which may, for example, be disposed horizontally and vertically, respectively, should be shaped and/or spaced so that the depth of the passageway between adjacent wires, measured along the electron axis, are at least twice the distance between the wires. In one form, the wires may be rectangular in shape to fulfill this requirement. It was shown that if a negative potential is applied to all grid wires, electrons will be repelled and none will pass through the grid. If one wire is made positive by 100 volts, say, electrons in the vicinity will be attracted to it, but none will pass through the grid. However, if two adjacent and parallel grid wires are made positive, then electrons will be accelerated towards and pass through the "gate" formed by those two wires. One adjacent horizontal pair and one adjacent vertical pair of wires can thus be considered as forming a window defined by the intersection of the two pairs through which electrons will pass only when all four wires are positive.

The potential barrier type of construction utilizes a cathode, a first accelerating grid near the cathode, a second accelerating grid just ahead of the control grid, a control grid and a suitable target electrode. The second accelerating grid consists of a plurality of wires equal in number to and in register with the wires of the adjacent control grid network. The control grid network nearest the cathode consists, for example, of a plurality of wires parallel to the axis of the cathode, that is, vertically arranged, while the second control grid network consists of an equal number of horizontal grid wires positioned next to the first network so that the two networks successively control the outward flow of electrons. All of the wires of each accelerating grid are connected together and suitable positive potentials applied thereto, say 100 volts. As before, the wires of the control grid networks are adapted to be individually biased with either one of two voltages to open and close selected windows. In the present case, a window will be closed to the passage of electrons if any one of the four grid wires defining it is biased to a negative potential of, say, 100 volts. To open a window, all four wires must be at cathode potential.

The present invention is not concerned with the shape or arrangement of the tube. Many modifications will be apparent, including those described in the co-pending application referred to above. For some purposes, the grid and target electrodes may lie in parallel planes, or perhaps in parallel segments of a cylinder. In other cases, a complete cylindrical form may be preferred in which the grid wires of one network are parallel to and equidistant from the central cathode and the other wires are circular, spaced along the length of the cathode and concentric therewith. Also the networks may be formed by wires which spiral in a right-handed and left-handed fashion, respectively, about the cathode. It will be appreciated, however, that in all cases the essential requirement is that there be at least two grid networks which are disposed so that the projection of each wire of one network intersects the projections of all the wires of the other network. For convenience hereafter the grid or grids of a given orientation (right-handed or concentric with the cathode, for example) will be called the X networks, while the networks which are complementary to or intersect the X networks will be called the Y networks. In each case there will always be at least one X and one Y network. The number of windows available, and hence the definition of the grid, is equal to the product of the number of wires in the X grid network multiplied by the number of wires in the Y grid network.

When the particular requirement is satisfied by a relatively small number of windows, no particular problem is involved in connecting the grid wires individually to controlled sources of potential. However, when economy of design demands the largest possible number of windows, say a million, it would be entirely impractical to bring out from the tube two thousand lead wires, one thousand for each grid network. However, such a large number of discrete control possibilities is entirely practical in an area selection tube. Such a number makes possible nearly unlimited design of computors where the tube is used as a memory device. Good definition is also desired where a fluorescent trace is produced by the successive opening of different windows to produce a visible picture.

Because the passage of electrons through a given gate of each grid network is controlled by the application of suitable voltages to two adjacent wires of the network, certain combinatorial arrangements are possible. That is, if certain grid wires of a network are interconnected permanently within the tube so that when two adjacent wires are energized to allow electrons to pass, the other grid wires connected to them do not lie adjacent to one another in any instance, then individual control can still be exercised and the number of external leads can be greatly reduced.

The so-called "binary" system for controlling a large number of windows with a relatively small number of leads is described and claimed by Rajchman in the application referred to above. Two alternative systems for controlling a large number of windows by means of a relatively small number of leads are described and claimed in co-pending application of G. W. Brown, Serial No. 694,041, filed August 30, 1946, now Patent No. 2,519,172, issued August 15, 1950. The first of the latter group is called the "group-of-one" system since for each grid network there is one group of leads, any two of which may be energized to open just one gate. The second is called the "group-of-two," since the leads from a given network are divided into two groups having the same or different numbers of leads in each group. In this case, a single gate is opened by the application of suitable voltages to one lead in each group.

Certain applications of the area selection tube require the successive selection of discrete target areas, that is, the opening of one gate after the other in succession, at a higher rate than can be accomplished by the manual operation of switches. In general, three types of switching or "scanning" may be employed: (1) scanning in successive point and line sequence in the manner employed in scanning the screen of a television tube, (2) scanning in a predetermined pattern where the windows which are opened successively in time are not necessarily adjacent in position but do have predetermined positions, and (3) scanning progressively through all available windows in time sequence in a purely arbitrary position sequence, where the position of the element selected at any instant is immaterial.

The first type of scanning might be used, for example, where the area control type of grid mesh is used with a fluorescent screen to produce a visible picture. The second type would be employed where scanning of a particular area is desired or to produce a predetermined visible trace without passing in time sequence through intermediate dark positions. The third type would be universally used when the area selection tube is used as a memory device, the only requirement then being that a particular memory element can be selected, the information stored, and later on the same element again selected to derive from it the data stored therein. It is the primary purpose of the present invention to provide a method of and means for accomplishing electronic scanning in a discharge device of the area control or selection type. It is a further object of this invention to provide extremely rapid electronic scanning in an area selection tube. It is a still further object of this invention to provide successive potentials which when applied to the control grids of an area selection tube produce successive scanning of discrete target areas in a predetermined position sequence.

As may be more fully understood from a consideration of the co-pending application referred to above, the grid control which accomplishes area selection requires the simultaneous application of a predetermined potential to at least two leads for each X and each Y grid network which is different from the potential applied to all other leads in order to cause only two adjacent grid wires in each grid network to open the gate between them. In the conventional type of cathode ray tube the position of the beam, and hence the particular area of the target impinged by the beam at any instant, is determined by the amplitude of the deflecting voltages or the intensity of the deflecting fields. Conventional methods cannot be used to scan the target of an area selection tube since the instantaneous position of the bombarded area is dependent upon the application of a predetermined voltage to different pairs of lead wires in a multitude of different combinations. Thus, to produce the equivalent of the conventional scanning, the pairs of leads to which the control voltage is applied must be changed, and the switching must be done at an extremely rapid rate and in the desired sequence.

It should be noted that in a deflection type area selection tube a gate is opened by the application of a potential of the order of +100 volts to the grid wires defining it, while the closed gates are biased to a value of approximately −10 volts. However, in the potential barrier type, a gate is opened by the application of cathode potential to the grid wires defining it, while the closed gates are biased to a value of approximately −100 volts. Since cathode potential may include 0 volts, with respect to ground, the value of zero is included within the meaning of the term "a potential," and whether this value be zero or +100, the value required to open the gate is called herein the "opening potential." All other pairs of grids will, of course, have at least one wire which is maintained at the value required for the type of control employed. It is, therefore, a further object of this invention to provide means for applying opening potentials to the lead wires of an area selection tube so as to produce scanning through a succession of incremental target areas.

The novel features that are considered characteristic of this invention are set forth with particularity in the appended claims. The invention itself, however, both as to its organization and method of operation, as well as additional objects and advantages thereof, will best be understood from the following description of several embodiments thereof, when read in connection with the accompanying drawings, in which Figure 1 illustrates a system for scanning a binary connected area selection tube with a binary counter;

Figures 2 and 3 are circuit diagrams of binary counters or flip-flops for producing opening potentials for deflection and potential barrier type area selection tubes, respectively;

Figure 4 explains the symbol utilized to indicate a flip-flop;

Figure 1:
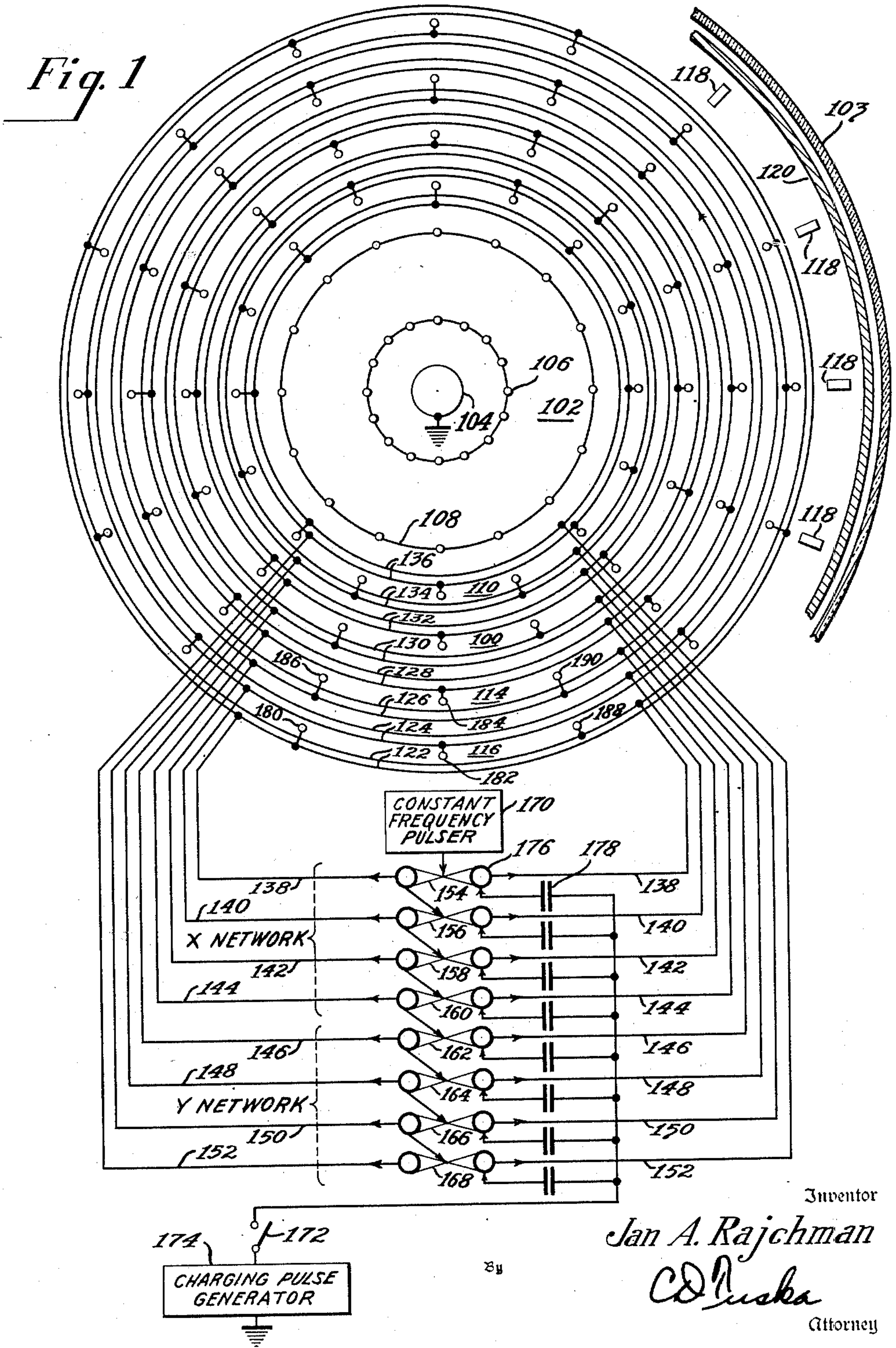

Fig. 1 illustrates a method of scanning an area selection tube 102 having the binary type of grid connection. A glass envelope 103 encloses the following elements: a central cylindrical cathode 104; a first accelerating grid 106; a second accelerating grid 108; two Y networks 110 and 100 of 16 grid wires each, each wire being represented by a small circle as it might appear when viewed from the end; two X networks 114 and 116; a collecting electrode 118; and a target electrode 120. It will be understood that the X and Y networks are physically disposed so that the projections of their grid wires on the target intersect, although this is not conveniently shown in this figure.

Within the tube the individual wires of each network are interconnected by eight pairs of conductors 122, 124 . . . 136, in any desired order which meets the requirements described in the earlier application of Rajchman, identified above. Eight pairs of lead wires 138, 140, 142 . . . 152 are provided for external connection to an area selection tube and are connected within the tube to the eight pairs of conductors. The lead wires are connected to the output (plate) terminals of eight flip-flops 154, 156, 158 . . . 168 which are of the type shown in detail in Fig. 3. Each flip-flop consists of two tubes which are so interconnected that they are stable in either one of two conditions. Either one tube is conducting and the other cut off, or vice versa. The first flip-flop 154 is driven by a constant frequency pulser 170 which produces voltage pulses of the required amplitude and polarity to cause the flip-flop to change over once for each pulse. The output of one of the tubes of each flip-flop (except the last one) is connected to the common input of the succeeding flip-flop. As a result, the first flip-flop 154 reverses with every pulse from the device 170, the second 156 with every second pulse, the third with every fourth pulse, etc. The eighth flip-flop 168 will thus reverse with every 64th pulse, and then the cycle is repeated.

The grid of one tube of each flip-flop is coupled through a capacitor and a push type switch 172 to a charging pulse generator 174. For example, tube 176 is coupled through capacitor 178. The charging pulse generator may simply be a battery. Its purpose is to set all flip-flops in the same or a predetermined condition, for reasons which will appear subsequently.

It is known that in the binary type of connection the two wires of each pair of leads, and thus each pair of conductors must be energized oppositely at all times. This fact makes possible the coding of the excitation, and hence the identification of the open gate of the networks, in accordance with the binary system of counting. The binary system is generally employed with the potential barrier type of grid control in which the opening potential is zero volts and the grids of the closed gates are biased to $-100$ volts. Since the two output connections of each flip-flop are connected to the two wires of a given pair of leads, which in turn are connected to the two conductors of a given pair of conductors, it follows that each of the eight pairs of conductors 122, 124 . . . 136 can be biased in either one of two ways depending upon the state of the flip-flop to which it is connected. If we say that the binary number 0 is represented by the condition in which the outer conductor of a given pair of conductors is at 0 volts (the inner conductor being at $-100$ volts) and the binary number 1 by the condition when the inner conductor is at 0 volts (the outer conductor then being at $-100$ volts) and letting each pair reading inwardly from pair 122 represent, respectively, the "places" or binary positions $2^0$, $2^1$, $2^2$ . . . $2^7$, then any eight-place binary number can be represented by the proper excitation of the pairs. Conversely, any one of the 256 possible windows of the system illustrated ($16\times16$) can be opened and identified by suitably conditioning the eight flip-flops which excite the pairs in accordance with the 256 possible permutations of the numbers in an eight place binary code.

In certain cases it is desirable to know the physical position of each window, in other cases the only need is to be able to select a given window by a given code combination. In order to illustrate how the physical location may be determined, the gates of the X network of the binary area selection tube illustrated in Fig. 1 will be located. Calling the zeroth gate the one controlled in the X network by grid wires 180, 182, 184 and 186, it will be observed that each wire is connected to the outer wire of a different pair of conductors, 122, 124, 128 and 126, respectively. This gate will then be opened when these outer wires are all at ground potential. The code for this combination is 0000. The next gate, number one (reading counterclockwise), is controlled by wires 182, 184, 188 and 190. This gate will be open when the outer pair 122 is energized so that its inner wire is at ground potential which corresponds to the code number 1 in the $2^0$ position. The other three pairs are as before. The code for this gate is, therefore, 0001. Reading around the ring the sixteen gates, numbered zero to fifteen, will open when the leads are excited by the normal operation at the binary counter as described above, as follows:

| (1) | (2) | (3) | (4) |
|---|---|---|---|
| Gate (X network) | Binary Code | Time Sequence To Open | Decimal Equivalent of Binary Code |
| 0 | 0000 | 0 | 0 |
| 1 | 0001 | 1 | 1 |
| 2 | 0011 | 3 | 3 |
| 3 | 0110 | 6 | 6 |
| 4 | 0100 | 4 | 4 |
| 5 | 0101 | 5 | 5 |
| 6 | 0111 | 7 | 7 |
| 7 | 0010 | 2 | 2 |
| 8 | 1000 | 8 | 8 |
| 9 | 1001 | 9 | 9 |
| 10 | 1011 | 11 | 11 |
| 11 | 1110 | 14 | 14 |
| 12 | 1100 | 12 | 12 |
| 13 | 1101 | 13 | 13 |
| 14 | 1111 | 15 | 15 |
| 15 | 1010 | 10 | 10 |

It should be noted that the interconnection of the grids and flip-flops in the manner illustrated causes the gates to open successively in a time sequence but not in position sequence. Consequently this system is best suited for use with a memory area selection tube where the physical location of the gate is immaterial. It may also be seen that the four flip-flops for the Y network will be similarly changed in order, and the Y gates opened in the same sequence to thereby open all the windows. Of course the pattern of connection between grid wires and conductors may be changed to vary the position sequence, or the connections between the leads and the conductors may be interchanged for the same purpose. In a system having $n$ binary places there will be $2n \times n!$ possible ways of connecting the tube, each producing a different space sequence. Where $n=8$, as in the present case, this number is over ten million. However, a strict point by point progression through successive lines such as the televisions cannot be obtained with the system illustrated in Fig. 1.

Figure 2:
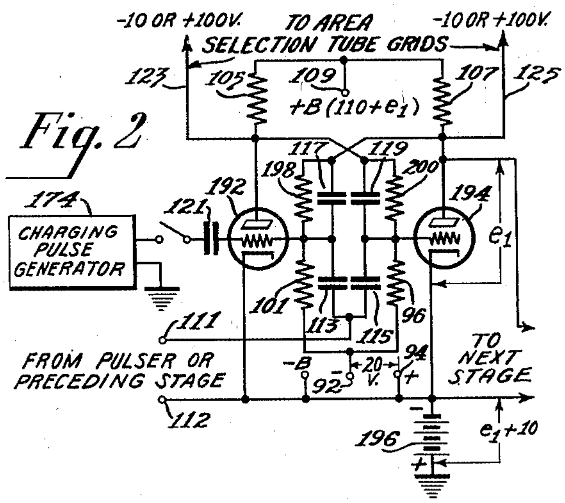

Referring to Fig. 2, there is shown the circuit diagram of a two-tube flip-flop of the type described on page 85 of the book "Electrical Counting" by W. B. Lewis, modified to provide the required output voltages. Two thermionic triodes 192 and 194 are employed. Their cathodes are connected together and through a fixed biasing battery 196 to ground. The grid of each tube is connected through a resistor, 198 and 200, to the plate of the other tube, and also through a resistor, 101 and 96, to a source of negative bias, available at terminals 92 and 94. Each plate is connected through a resistor, 105 and 107, to a source 109 of positive potential. Common input to both grids from a pulser, or another device of the same type, is applied to terminals 111 and 112 and through capacitors 113 and 115 to the two grids. Each grid is also coupled to the other plate by a capacitor, 117 and 119. A charging pulse generator 174 may be coupled to the grid of either one of the tubes, as for example, tube 192, through a capacitor 121. Output connections 123 and 125 are taken from the plate electrodes. These are the connections which are made to the pair of leads 138, for example, in Fig. 1.

In order to operate a deflection type area selection tube the output voltage on each output terminal must be either −10 or +100 v. in push-pull relationship, with respect to the area selection tube cathode which is normally operated at ground potential. One way of accomplishing this is to operate all the flip-flops at a fixed potential below ground potential. Due to the interconnection between tubes 192 and 194 only one tube can be conducting at a given time since the conducting tube cuts off the other tube. The plate potential with respect to cathode then swings between the potential of the plate supply, when the tube is cut off, and a positive value $e_1$ representing the voltage drop across the tube when it is conducting maximum current. The value of the bias produced by battery 196 should be, in the present case, $e_1+10$, and the plate supply $110+e_1$ volts. Measured to ground the output wires 123 and 125 will then swing between −10 and +100 v. as required, oppositely.

The flip-flop is caused to change from one steady state to the other by a pulse which is applied to both grids. The pulse may be either positive or negative. If a positive pulse is applied it has no effect on the tube which is already conducting. The other tube, however, is forced to conduct as its grid is driven positive. The amplification of the tube causes an amplified negative pulse to be applied to the grid of the first tube, which overcomes the existing grid voltage of that tube and cuts it off. The second tube then conducts until a subsequent pulse shifts the conductivity again. In case it is desirable to put the flip-flop in a predetermined condition, a suitable pulse may be applied to the grid of one or the other of the tubes. A negative pulse from the charging pulse generator 174 can be applied to the grid of tube 192, for example. If this tube is already cut off, nothing is changed. If, however, the tube is conducting the negative pulse will trip the flip-flop and put tube 192 in a non-conducting condition. It will be seen, therefore, that a pulse applied to both grids causes the condition of the flip-flop to change from whatever it was to the opposite condition, while an impulse applied to only one grid will cause the flip-flop to assume any desired predetermined condition.

Figure 3:
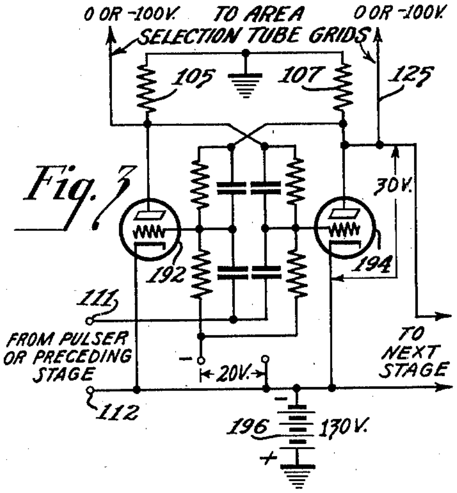

Fig. 3 is a modified circuit of the same type designed to provide 0 or −100 volts for the operation of a potential barrier type area selection tube. The circuit connections are the same as those of Fig. 2 and need not be repeated. However, in this case the B+ potential is zero, that is, the plates are tied to ground through resistors 105 and 107, while the potential of battery 196 is now 100 v. plus $e_1$. Assuming $e_1$ is 30 volts, battery 196 would supply 130 volts. It should be noted that the polarity is such that the tube cathodes are negative with respect to ground while, as before, he grids are returned to the common cathode lead so as to establish the proper grid-cathode bias. When tube 194 is cut off there is no current through resistor 107, and the potential of conductor 125 will be zero. When the tube conducts, however, the plate approaches cathode potential which is −130 volts. The drop through the tube subtracts 30 v. from this value so the net potential of conductor 125 is −100 volts. These two values are the ones required. Of course other values could be employed as required by changing the circuit parameters in accordance with the requirement, as is well known.

Figure 4:
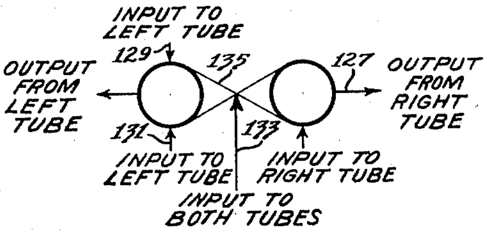

A simplified schematic representation of a flip-flop is shown in Fig. 4. This symbol is employed throughout this application to represent a flip-flop so as to simplify the drawings. A line with an arrowhead pointing away from either one of the circles represents an output connection taken from the tube indicated. Thus, the output connection 125 of the right hand tube 194 of Fig. 2 or 3 is symbolized by the line 127 in Fig. 4. A line with an arrowhead pointing toward the circle represents a connection to the grid of the tube. For example, the input connection to the grid of tube 192 from the generator 174 is represented by line 129 or line 131. An input connection to both grids such as that provided from terminals 111 and 112 of Fig. 2 is represented by the line 133 with the arrowhead terminating at the crossed lines 135.

Referring again to Fig. 1, the operation of the binary counter will now be understood. Since each flip-flop reverses the following one from whatever condition it was previously in, all must initially be set in a known condition if the space sequence of the opening of the area selection tube windows is of any consequence. Switch 172 would only be operated to start the system, and thereafter it would run continuously through repeated duplicate cycles. Where the space sequence is of no consequence, as in the case of memory storage, the generator 174 would not be required.

Figure 5:
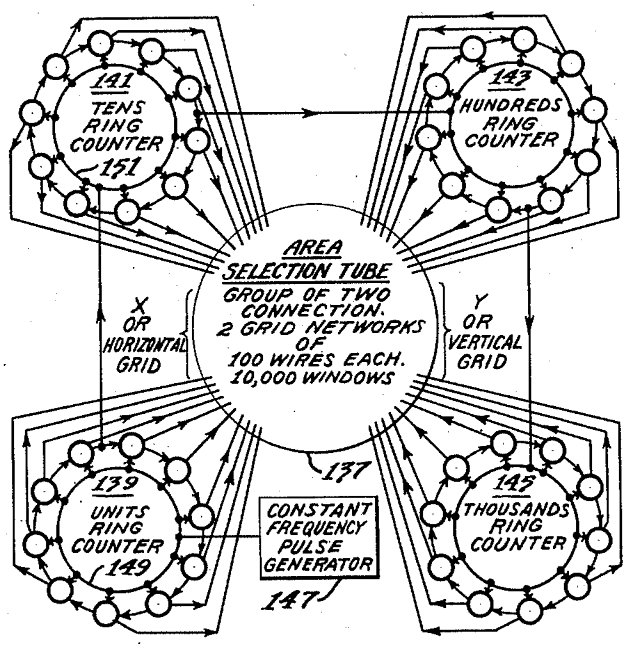
Figure 5 illustrates the scanning control of a group-of-two area selection tube by means of ring counters.

A system for opening in time sequence all windows of an area selection tube connected for group-of-two grid control is illustrated in Fig. 5. The group-of-two connections is described and claimed in the copending application of G. W. Brown referred to above, and therefore the internal connections of the area selection tube 137 have not been shown in detail. For purposes of illustration it is assumed that the area selection tube has 10,000 windows or memory elements controlled by two grid networks of 100 wires each. The external leads are arranged in two groups of ten for the X network and the same for the Y network, or a total of 40 leads, as shown. It will be assumed that the deflection type of grid control is used, although the system is equally applicable to the potential barrier type of construction.

Each group of 10 leads is energized by a ten tube ring counter, 139 and 141 being connected to the horizontal or X network and 143 and 145 being connected to the vertical or Y network. Each ring counter is identical and may consist of ten gas tubes connected in a ring in such a manner that at any time only one of the tubes is conducting. A control pulse supplied by a constant frequency pulse generator 147 is impressed simultaneously on the grids of all ten tubes of the "units" ring 139 through a conductor 149. The output of one of the tubes of the units ring is connected to all the grids of the "tens" ring counter 141 through a conductor 151. Similarly the output of the tens ring is applied to the "hundreds" ring 143 and from the latter to the "thousands" ring 145.

Figure 6:
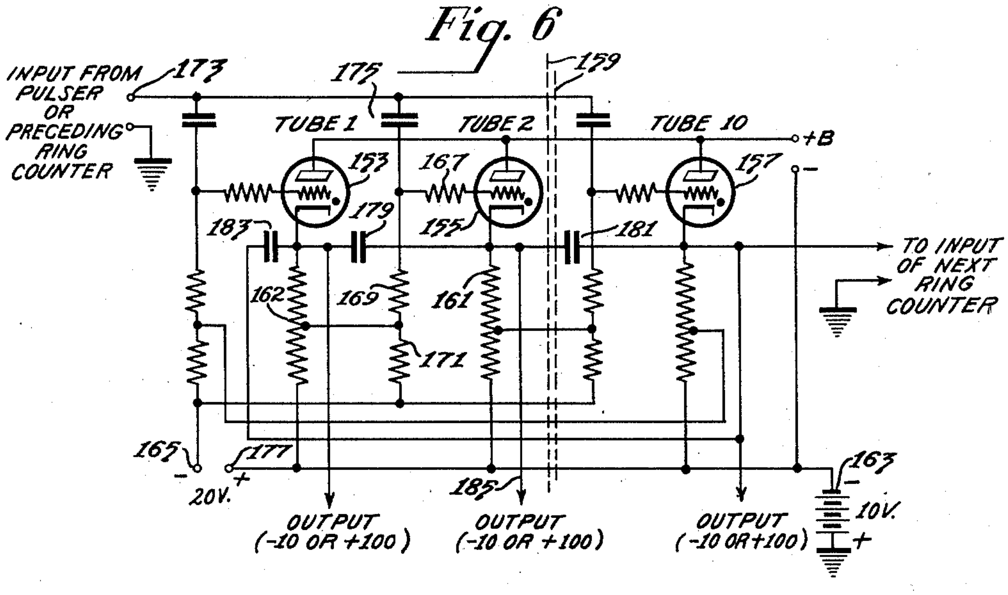
Figure 6 is the circuit diagram of a ring counter.

Before describing the general operation, the nature of a ring counter should be understood, and reference is therefore made to Fig. 6. This circuit is basically that illustrated in Patent No. 2,146,862, issued to Shumard, February 14, 1939, modified slightly to provide output voltages of the range suited to the present requirement, that is, −10 and +100 volts. Only three tubes 153, 155 and 157 of the ten tube counter are shown since the connections of any tube to the one preceding and the one following it are identical with the same connections of any other tube. It will be understood, therefore, that seven tubes have not been illustrated, as indicated by the dotted lines 159. The cathode of tube 155, for example, is connected through a tapped resistor 161 to the negative terminal of a source of D. C. voltage such as battery 163, the positive terminal of which is grounded. The grid of the same tube is connected to the negative terminal 165 of a source of D. C. bias voltage through a grid limiting resistor 167 and resistors 169 and 171. The mid-point of resistors 169 and 171 is connected to the tap of the cathode resistor 162 of the preceding gas tube 153. The grid of tube 155 is also coupled to an input terminal 173 through a capacitor 175. The positive terminal 177 of the grid bias source is connected to the negative terminal of battery 163 so that the entire circuit is operated 10 volts below ground potential. The cathode of tube 155 is coupled to the cathode of the preceding tube by a capacitor 179 and also the cathode of the following tube by a capacitor 181. Output is derived from conductor 185 connected to the cathode. Since all tubes are connected identically the above description will fit any tube and the entire circuit need not be described further. It should be noted that the cathode of the last tube 157 is coupled back to the cathode of the first tube 153 through capacitor 183 and the connection from the cathode resistor to the grid of the first tube is also provided. Thus the tubes are, in effect, connected in a continuous ring.

In describing the operation of the device, assume that only tube 153 is conducting. It will be observed that the D. C. grid bias in tube 155 depends on (*a*) the value of the potential connected between terminals 165 and 177 and (*b*) the amplitude of the positive voltage due to the connection to the cathode resistor 162 of the preceding tube. These voltages are so chosen that the net grid-to-cathode voltage of tube 155 is just sufficiently negative to keep the tube from conducting. However, component (*b*) is not present on the grid of any other tube so that all the other grids are biased to a much more negative value.

Assume that a positive pulse is applied to input terminal 173 having an amplitude less than the grid bias of all tubes except tube 155, but greater than the net grid bias of the latter tube. The pulse will be applied equally to the grids of all the tubes, but the only grid which will be driven positive is that of tube 155, that is, the tube following the tube which was conducting when the pulse arrived. As a result, tube 155 will break down, and conduct full current even though the positive impulse does not continue. The grid loses control as is well known. The cathode suddenly rises in potential as current flows through resistor 161. Through capacitor 179 a positive pulse is sent back to the cathode of the preceding tube 153 which reduces the effective plate potential of that tube below the extinction value, causing tube 153 to cut off. At the same time, a fixed positive increment of voltage is applied to the grid of the following tube 153, thus conditioning it for the next cycle of operation.

The operation of the circuit then is that only one tube can conduct at a time. Each control pulse applied to all tubes alike causes the tube which is then conducting to be extinguished and the one next following to become conductive. The output potential of each tube, with respect to ground, varies between a value of −10 volts when the tube in question is cut off, and a positive value, +100 v. say, when the tube is conducting.

Referring again to Fig. 5, it will now be seen that at any instant one and only one lead in each of the four groups has applied to it an opening potential. Continuous scanning is accomplished since all possible combinations of leads are energized in sequence. Each time the complete cycle of 10 is completed in the units ring 139, the tens ring 141 advances one step so that 100 possible combinations are obtained which open successively the 100 gates of the X network. While this is being completed, rings 143 and 145 open a particular gate in the Y network, which may be compared to a line in a conventional scanning system. As the second cycle starts in the X network, a pulse applied to counter 143 changes the Y network combination and opens a new gate or line. This continues until all 10,000 windows have been opened in succession.

It will be appreciated that a group-of-two area selection tube of the type illustrated in Fig. 5 is particularly suitable for decimal system coding where it is desired to select particular windows which are identified by a four-place number. The group-of-two system of internal connection has certain advantages, but since the opening potentials are not applied to fixed pairs of leads it is not suitable for coding in the binary system. Binary excitation or coding may be desirable with such a tube, however, and a circuit for converting from binary to group-of-two excitation is illustrated in Fig. 7.

Figure 7:
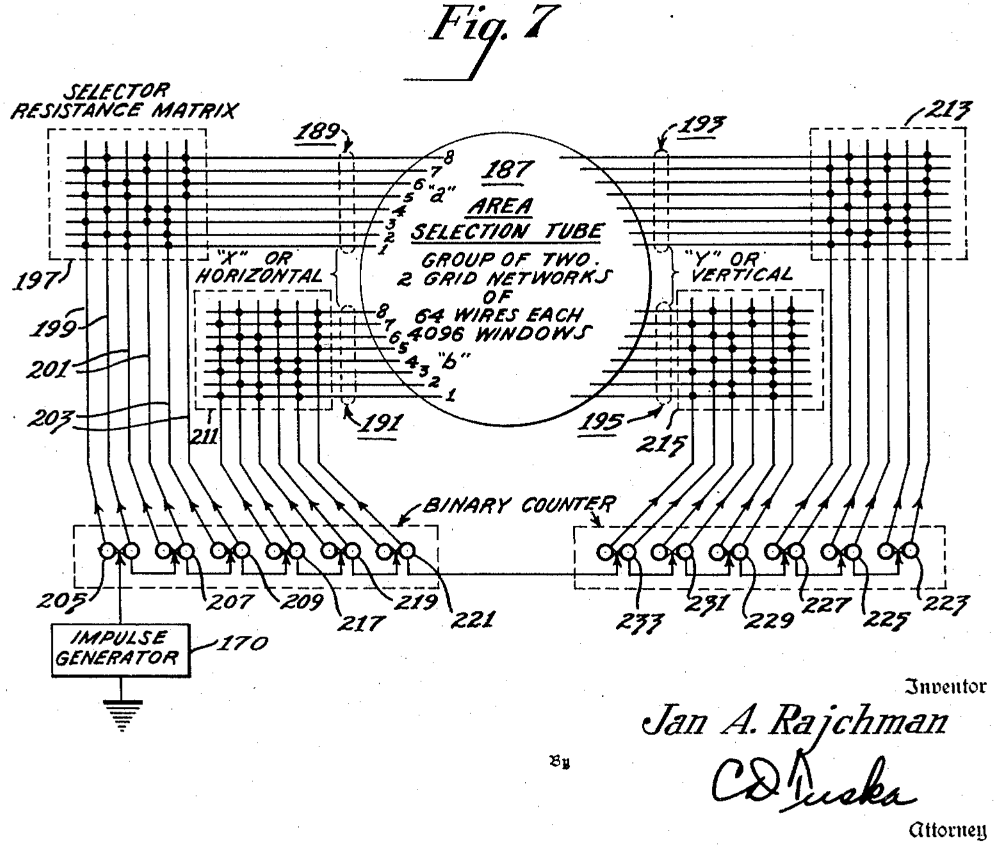
Figure 7 illustrates the use of resistance matrices to scan a group-of-two area selection tube in accordance with a binary code.

A group-of-two area selection tube 187 having, by way of illustration, two grid networks of 64 wires each internally connected to two groups of eight leads is schematically illustrated in Fig. 7. Groups 189 and 191 control the X network and group 193 and 195 control the Y network. Leads 189 are connected respectively to the eight horizontal wires of a resistance matrix 197 which includes three pairs of vertical wires 199, 201 and 203 terminating respectively in the six tubes of three flip-flops 205, 207 and 209. Similarly leads 191 connect to matrix 211; leads 193 connect to matrix 213 and leads 195 connect to matrix 215. Matrix 211 is connected to three flip-flops 217, 219 and 221; matrix 213 connects to flip-flops 223, 225 and 227; while matrix 215 connects to flip-flops 229, 231 and 233. The first flip-flop is driven by impulses from a pulse generator 170, and the output of one tube of each flip-flop is connected to the common input of the following one in the manner shown in Fig. 1.

The resistance matrix employed in the present invention is described and claimed in a copending application of J. A. Rajchman, Serial No. 508,343, filed October 30, 1943, for Electronic Computing Device, now Patent No. 2,428,811 issued October 14, 1947. Briefly, the matrix consists of two groups of orthogonal conductors represented by the horizontal and vertical lines of the matrix. Resistors of high value, say 100,000 ohms, connect selected horizontal conductors with one or more vertical conductors. In order to simplify the drawing these resistors have been indicated by heavy dots on the intersection of the conductors which they interconnect. Of course, it is understood that it is not essential that the groups of conductors be mutually at right angles so long as they are properly interconnected.

The scheme for connecting the resistors of each matrix has a very large number of variations which change the physical gate which is opened in a given network for a given order of excitation. The requirement that must be met to insure unique control is that one and only one horizontal matrix conductor, and hence one and only one lead is connected to the vertical conductors of the matrix in a given pattern. This will be explained further in connection with matrix 197 and the associated flip-flops. It should be noted that the three other matrices are connected identically.

Assume that when the left hand tube of each flip-flop is conducting its output voltage is zero. Flip-flops 205, 207 and 209 represent the $2^0$, $2^1$ and $2^2$ binary places, respectively. If we further assume that the binary number "zero" is represented by the condition of each flip-flop when its left-hand tube is conducting, and "one" by the reverse condition, then it follows that the binary number 000 applied to the three flip-flops being considered would cause the left hand conductor of pairs 199, 201 and 203 all to be at zero potential. It will be observed then that the lower conductor of group 189 will be at zero potential because it is connected, through the matrix resistors, to three conductors which are all at that potential. Any other horizontal conductor of group 189 is at a lower potential since every other lead is connected to at least one conductor of the three pairs which is at a negative potential. This may be checked by observation. It follows that applying binary number 001 to the flip-flops is accomplished by reversing the condition of flip-flop 205 so that the right hand conductor of pair 199 is now at ground potential. In this case the second horizontal lead is now the only one at ground potential, all others being connected to at least one vertical conductor which is at a negative potential. As the successive alternations of the flip-flops are made the remaining horizontal leads in turn go to ground potential, and a similar progression takes place in all the other matrices so that at any instant one and only one lead of each of the four groups is at ground potential. Since for a potential barrier type area selection tube, zero is the "opening" voltage, the necessary selection of gates in each network is accomplished in a time sequence until all possible windows have been opened, one at a time, and then the cycle is repeated.

The actual potential of any horizontal matrix conductor is determined by the average of the potentials of the vertical conductors to which it is connected. Consequently it is necessary to modify the circuit constants of the flip-flop shown in Fig. 3 so that the output is −300 volts and 0. Then the tube input leads can have any one of four values, 0, −100, −200 or −300. All the negative values are sufficient to close a gate and the operation of the control grid is not affected, although due consideration may have to be given in its construction to insulate the leads for the higher voltages.

It may be shown that a symmetrical internal grid to lead connection will result in a position sequence which is not uniform when opening potentials are applied consecutively to the leads. The symmetrical matrix connection shown will also produce a similar position sequence since the operation of the matrix has just been shown to apply the opening voltage to the input leads in regular sequence, as before. However, there are 8! different ways of connecting each matrix, each meeting the requirement for unique control, and so there are $(8!)^2$ possible scanning patterns. All of these scan along a given horizontal (or vertical) line first and then move through other horizontal (or vertical) lines to complete the scan. It is also possible to rearrange the sequence of the flip-flops, or rearrange the connections to them, and thereby make possible a much larger number of scanning sequences.

Figure 8:
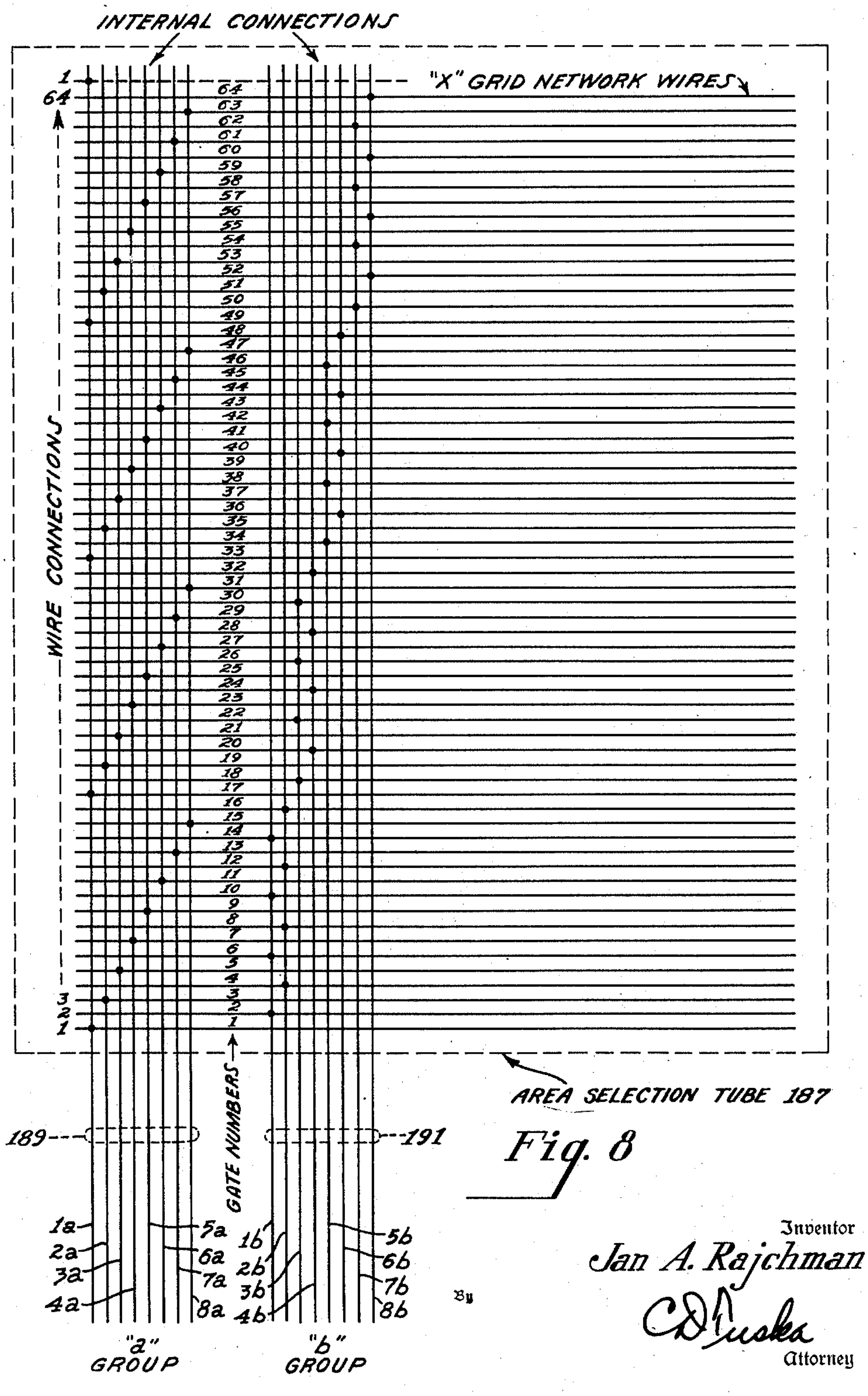
Figure 8 illustrates the internal connections of a group-of-two area selection tube having 64 grid wires controlled by 16 input leads.

The actual physical sequence for the successive opening of windows of the area selection tube 187 depends, as indicated above, on the internal connections employed. One symmetrical arrangement for an "eight by eight" tube with 64 grid wires in each network is illustrated in Fig. 8. The sequence is obtained by connecting the 64 wires in sequence from 1 to 64 to the groups of leads in accordance with the following plan: Connect the odd numbered grid wires to the "*a*" group leads (189) in regular sequence 1 to 8 repeated four times. Connect the even numbered grid wires to the "*b*" group leads (191) alternately to 1 and 2 repeated four times, then 3 and 4 repeated four times, through 7 and 8 in the same manner.

Connected internally in the above manner, and driven by two rings of eight counters as in Fig. 5, or by the binary counter and resistance matrix as shown in Fig. 7 where the opening potential is applied to the "*a*" group of leads from the first to the last in numerical sequence while the opening potential is held on the first lead of the "*b*" group 191, then repeated through the "*a*" group 189 while the second lead of "*b*" group 191 is excited, and so forth, the physical progression of gates which are opened in time sequence will be as follows, it being assumed that the number one gate lies between grid wires 1 and 2, number two gate between wires 2 and 3, etc., while the 64th gate lies between wires 64 and 1: 1, 2, 5, 6, 9, 10, 13, 14, 16, 3, 4, 7, 8, 11, 12, 15, 17, 18, 21, 22, 25, 26, 29, 30, 32, 19, 20, 23, 24, 27, 28, 31, 33, 34, 37, 38, 41, 42, 45, 46, 48, 35, 36, 39, 40, 43, 44, 47, 49, 50, 53, 54, 57, 58, 61, 62, 64, 51, 52, 55, 56, 59, 60, 63. The above sequence is obtained by noting which adjacent pairs are connected to the "open" leads taken in the sequence stated above.

Figure 9:
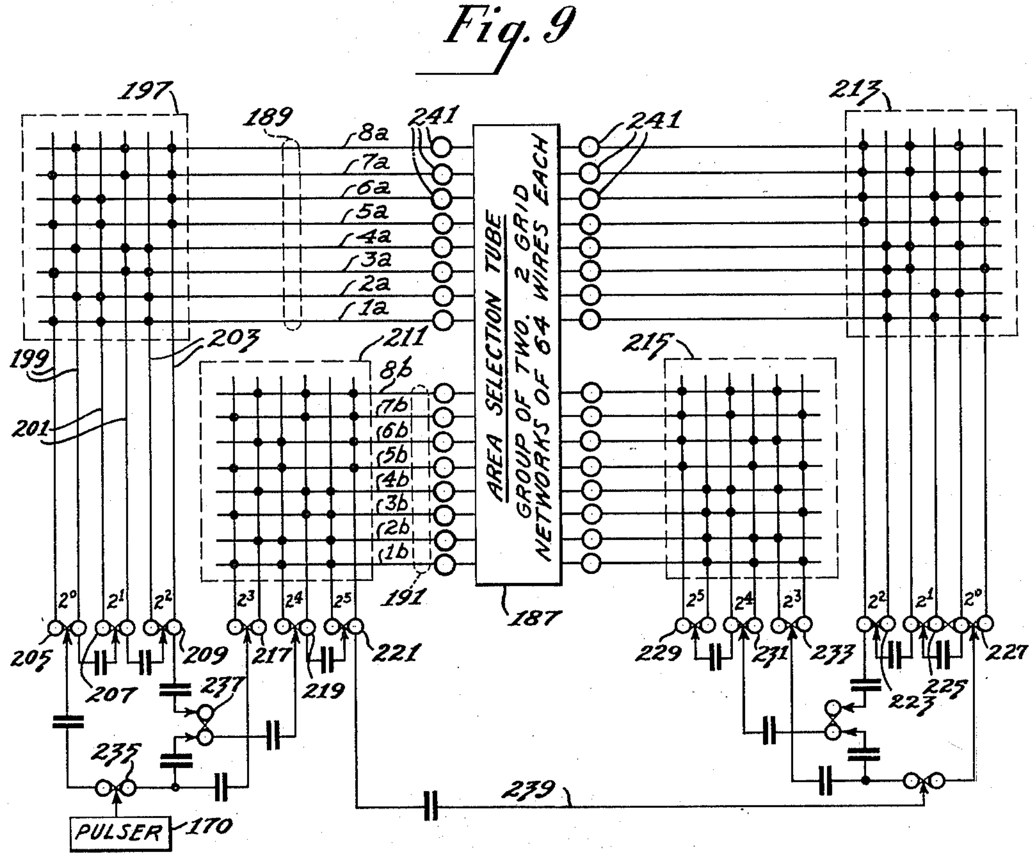
Figure 9 illustrates a universal scanning system for a group-of-two area selection tube utilizing resistance matrices and a modified binary counter.

In order to obtain the point by point sequence through successive lines in order, the system illustrated in Fig. 9 may be employed. This system is again illustrated as applied to a 64 wire network group-of-two selection tube 187, connected internally as shown in Fig. 8 and employing four resistance matrices connected as shown in Fig. 7. The twelve flip-flops are interconnected with each other somewhat differently, than in the previous case, but each flip-flop energizes one of the twelve pairs of conductors for binary type excitation. The pulser 170 drives an auxiliary flip-flop 235, the output of the left hand tube of which drives the flip-flop 205 in the binary position $2^0$. The first in turn drives the second flip-flop 207 which in turn drives the third flip-flop 209. The output of the latter device is coupled to the input of the left hand tube of a second auxiliary flip-flop 237, the right hand tube of which is driven by the right hand tube of the first auxiliary 235. The same source 170 also drives the fourth flip-flop 217. The fifth flip-flop 219, however, is driven by the output of the right hand tube of the second auxiliary flip-flop 237. The last flip-flop of the network, 221, is driven by the preceding one and in turn supplies the control voltage for the other network through lead 239. From this point the second network is identical to the first.

To understand the operation of the system described above, note that for each pulse from pulser 170 the control voltage provided by flip-flop 235 is applied first to change the input to matrix 197 and then matrix 211, alternatively. Assume that the six flip-flops controlling matrices 197 and 211 are in such condition that the first leads $1^a$ and $1^b$ of groups 189 and 191 are open. From Fig. 8 it is seen that this opens the first gate. The next count will change the auxiliary flip-flop 235 which will send a pulse to flip-flop 205 causing it to reverse, changing the excitation from lead $1^a$ to $2^a$ and opening gate number 2. The next count opens lead $3^a$ leaving $2^b$ open for gate four, etc., in sequence until $8^a$ and $2^b$ are open for gate fifteen. During this time flip-flop 237 has not changed since the pulse from auxiliary device 235 applied to the right hand tube merely tried to condition this tube to the state it was already in. The next cycle then changes flip-flop 209, giving leads $1^a$ and $2^b$ for gate sixteen and at the same time settling flip-flop 237 in the other position. The next pulse does not change $1^a$ but returns 237 to its original condition thus creating a pulse which operates flip-flop 219. 217 was also changed so that lead $3^b$ is opened for a combination opening gate seventeen. The next reversal of 235 changes flip-flop 205 giving $2^a$ and $3^b$ for gate 18. The next control pulse revises 217 to select lead $4^b$ which with $2^a$ opens gate 18. By observation it may thus be seen that the gates in the horizontal network are opened in space sequence, that is, numerically from 1 to 64. The closing of the 64th horizontal gate then passes on a pulse to the vertical network through lead 239 which opens the second gate of the vertical network. Each time a complete horizontal scan is completed the next vertical gate is opened. This results in a space by space, line by line type scan suitable for the reproduction of picture images, if desired.

In case it is desired to limit the grid voltages to standard values, coupling tubes 241 may be included in the area selection tube input leads. These tubes would normally be operated at cut-off or saturation to produce the opening voltages required.

Figure 10:
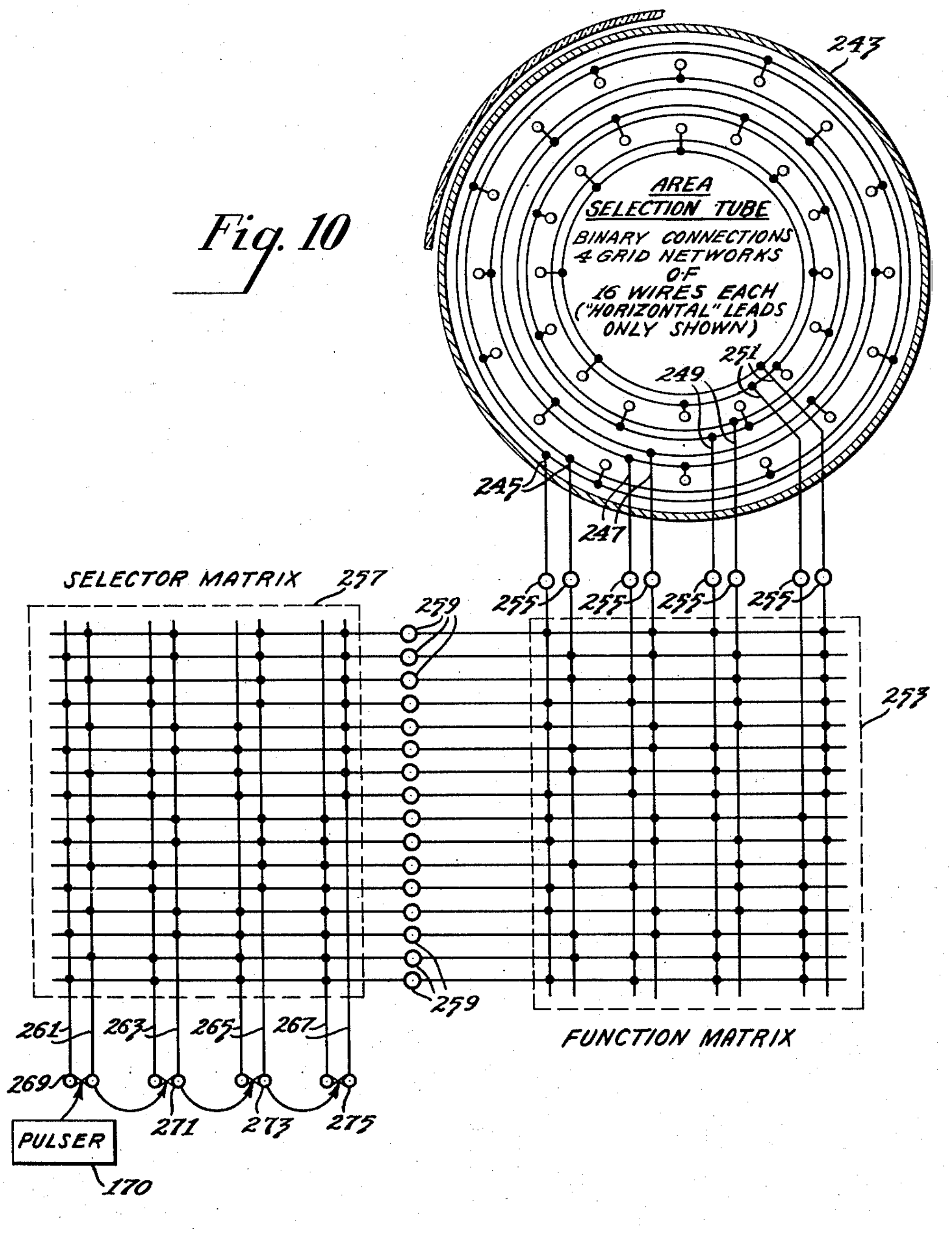
Figure 10 illustrates a universal scanning system utilizing an area selection tube matrix and a function matrix to control a binary area selection tube from a straight binary counter.

An arrangement for obtaining any desired space sequence with a binary type area selection tube 243 is illustrated in Fig. 10 which represents a binary type area selection tube having two horizontal and two vertical networks of 16 wires each. Only one network is shown since the other is identical. The four pairs of leads 245, 247, 249 and 251 are coupled to as many wires of a function resistance matrix 253 by means of a plurality of coupling amplifiers 255. The orthogonal wires of matrix 253 are coupled to an equal number of wires of a selector resistance matrix 257 by means of a like number of coupling amplifiers 259. The number of these wires is equal to the number of grid wires to be controlled, sixteen in the case illustrated. The area selection tube matrix is controlled by four pairs of wires 261, 263, 265 and 267 which are energized by four flip-flops 269, 271, 273 and 275 connected as a binary counter, the first one being driven by a pulser 170. The purpose of the area selection tube matrix is to select in the desired sequence the one wire which is to be at opening potential. In the case illustrated this will occur in numerical order. The function matrix is then set up in any desired manner so as to open the desired gate for any combination. By a combination of the two matrix adjustments any desired order may be obtained in the area selection tube in a manner which will now be understood and need not be described further.

Figure 11:
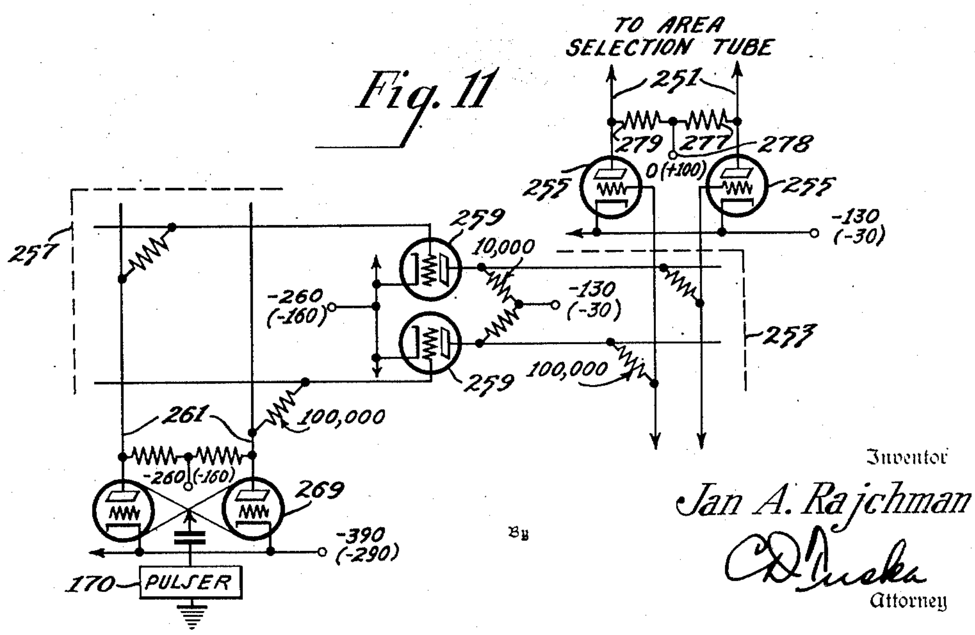
Figure 11 is a circuit diagram showing a detail of a portion of Fig. 10.

In order to demonstrate a method suitable for deriving the opening potential required to operate the type of area selection tube employed, a detail of Fig. 10 is shown in Fig. 11. Since a matrix directly couples the plate of the input tube to the grid of the output tube, and since the steady state condition controls the selection, D. C. amplifiers having stepped voltage supplies are required. Thus leads 251 connect to the plate electrodes of two amplifiers 255. For potential barrier operation the opening voltage is 0, while for the deflection type the opening voltage is +100 v. In the former case the plates would be connected at terminal 278 to ground, or 0 volts, through plate resistors 277 and 279 respectively, while in the latter case the plate source would be +100 v. In order to consider both conditions at the same time the correct voltages for the potential barrier operation have been shown at each source terminal, while the voltage for deflection operation has also been shown in parentheses. The cathodes are operated at −130 volts (or −30 volts), while the grids are connected directly to the matrix 253, only two pairs of which are shown, one horizontal and one vertical. The matrix input or horizontal leads connect to the plates of tubes 259, which are energized by a source of voltage of −130 (or −30) volts. The cathodes of tubes 259 are tied to a source of voltage producing −260 (or −160) volts, while the grids connect to matrix 257 where they connect to the plates of tubes 269. These plates are energized by a source of voltage which is −260 (−160) volts, while the cathodes of these tubes return to a point −390 (or −290) volts, are measured with respect to ground. It may thus be seen that each amplifier has suitable operating voltages applied to it, and the desired voltages are available for the operation of the area selection tube.

Figure 12:
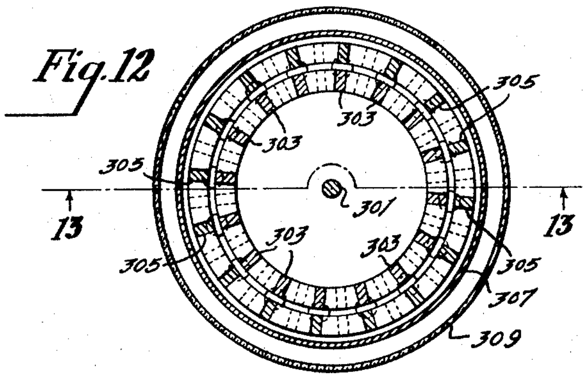
Figures 12 and 13 are sectional views of an embodiment of an area selection tube included to illustrate the disposition of selecting grid networks within the tube.
Figure 13:
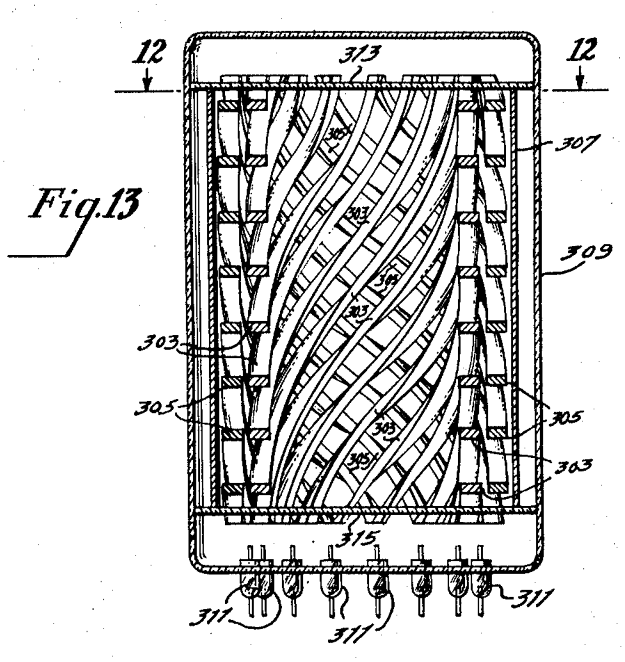

Figures 12 and 13 are included to illustrate the essential features of one embodiment of an area selection tube employing two grid networks of 32 wires each, although for simplicity of illustration every other grid wire has been omitted, the missing wires being indicated by dotted lines where they terminate. A central cylindrical cathode 301 is provided which may be indirectly heated in conventional manner. The first grid network consists of 32 rectangular grid wires 303, each wire being mounted at its extreme ends in mica supporters 313, 315 and spiralling concentrically about the cathode so as to be equidistant from the cathode. The pitch is such that each wire completes a half a turn about the cathode. The wires are uniformly spaced from each other, and bent so that the thin edge is always perpendicular to radial lines passing through the cathode. Looking down on the top view (Fig. 12) the wires of the first network spiral downward in a counterclockwise direction. The second grid network lies just outside the inner network, and is concentric therewith. Each of its wires 305 spirals in a clockwise direction. Consequently, each wire of the first network intersects or crosses each wire of the second network when viewed from the cathode to form a complete grid mesh of 1024 windows. Enclosing the grid is a cylindrical target electrode 307 which may be of various forms such as a dielectric memory element having storage areas, a fluorescent screen, or both. The electrodes are all mounted within a suitable evacuated glass envelope 309. At one end, the necessary leads are brought out through small glass to metal seals 311 in well known manner. The number of leads is determined by the system used to interconnect the grid wires plus those required for cathode, heater and target electrodes. No attempt has been made to show the internal connections, since these have been fully explained above.

There has thus been described circuits for applying opening potentials to the input leads of an area selection tube which permits random or any desired position sequence scanning, both for potential barrier and deflection type operation and for tubes internally connected in the group-of-two or binary patterns. Scanning may be controlled by binary counters, ring counters or modified counters.

What I claim is:

1. An electronic control system comprising a source of electrons, a target and a grid for controlling the flow of electrons to said target, said grid comprising a plurality of parallel wires disposed between said cathode and said grid so as to define gates between adjacent wires through which electrons may pass only when a predetermined potential is applied to adjacent wires, and an electronic counter circuit network for applying said predetermined potential to adjacent grid wires in a time sequence such that adjacent gates are opened in time sequence whereby said target is scanned by impinging electrons.

2. An electronic control system comprising a source of electrons, a target and a grid for controlling the flow of electrons to said target, said grid comprising a plurality of parallel wires disposed between said cathode and said target so as to define gates between adjacent pairs of wires, a plurality of control leads in pairs connected to said wires in predetermined groups to provide a predetermined control pattern, and a series of flip-flop voltage generators for causing said generators to apply sequentially one of two predetermined voltages to selected pairs of leads, whereby electrons are connected between pairs of said control leads and a control connection between said generators permitted to pass between different pairs of grid wires in time sequence.

3. An electronic control system comprising a source of electrons, a target and a grid, said grid comprising a plurality of wires relatively angularly disposed to define windows between pairs of said wires, a plurality of leads for making connections to said wires, the number of leads being less than the number of wires, each lead being connected to one or more of said wires, and an electronic flip-flop circuit having a plurality of flip-flop elements inter-connected in a network with said leads for applying predetermined potentials to selected pairs of said leads in a continuous repetitive sequence to open said windows to the flow of electrons in time sequence.

4. An electronic control system comprising a cathode source of electrons, a grid and a target electrode, said grid comprising at least one network of a plurality of parallel grid wires for controlling the flow of electrons to said target, a plurality of leads for each network, the number of leads being substantially less than the number of wires in a network, each lead being connected to one or more grid wires, a plurality of pulse responsive electronic voltage generators connected respectively to said leads in a predetermined series, and a pulse source connected with said series for causing said generators to apply sequentially one of two predetermined voltages to selected pairs of leads, whereby electrons are permitted to pass between different pairs of grid wires in time sequence.

5. An electronic control system comprising a cathode source of electrons, a grid and a target electrode, said grid comprising at least one network of a plurality of parallel grid wires for controlling the flow of electrons to said target, a plurality of pairs of leads for each network, connections between said leads and selected ones of said grid wires, a plurality of pulse responsive electronic counter type voltage generators having two output connections, the voltages available at said output connections having alternately one or the other of two predetermined values in push-pull relationship, each pair of leads being connected to the two output connections of a voltage generator, and a control circuit inter-connecting said generators for sequentially altering said generators to apply successively different voltage combinations to said leads.

6. An electronic control system comprising a source of electrons, a target and a multi-wire grid for controlling the flow of electrons through said grid to said target, a plurality of leads for making connection to selected ones of said grid wires, said leads being divided into two groups, adjacent grid wires being connected to leads of a different group and no two adjacent wires being connected to the same leads as any other two adjacent wires, a series of electronic counter circuits for applying a biasing voltage to all the leads of each group except one, an electronic counter circuit for applying an opening voltage to said one lead of each group, and a pulse responsive control connection between said circuits for sequentially causing said opening voltage to be applied to a different lead of each group.

7. In combination with a group-of-two area selection tube having a source of electrons, a target, a multiwire grid and a plurality of leads for making connection to selected ones of said grid wires, said leads being divided into two groups, adjacent grid wires being connected to leads of a different group and no two adjacent wires being connected to the same leads as any other two adjacent wires, a binary counter circuit network for applying opening potentials to one lead of each group to thereby open the electron gate between the adjacent grid wires connected to the leads, and a resistance matrix between said network and said leads for successively applying said opening potentials to other leads of each group in predetermined combinations to successively open the gates defined by all adjacent grid wires.

8. In combination, an area selection tube having two groups of leads for making external connection to a plurality of grid wires of a grid network, and a resistance matrix connected to each group of leads, the input to said matrix comprising pairs of leads, and a binary counter connected to energize said pairs of leads in push-pull.

9. A device of the character described in claim 8 in which the number of pairs of input pairs to the matrix is determined as the number which provides as many ways of applying two predetermined voltages to said pairs as there are leads in each group coupled thereto by the associated matrix.

10. In combination, an area selection tube having two groups of leads for making external connection to selected ones of a plurality of grid wires of a grid network, means for applying opening voltages to selected pairs of adjacent grid wires in sequence, said means comprising a binary counter for producing a plurality of pairs of voltages each of relatively reversible amplitude, a resistance matrix connected to each group of leads, and pairs of input conductors for said matrix, said conductors being energized by the voltages produced by said binary counters.

11. A device of the character described in claim 10 in which said binary counter is driven at a constant rate by an impulse generator whereby opening voltages are applied to selected pairs of grid wires in continuous time sequence.

12. In combination, an area selection tube having at least two grid networks each consisting of a plurality of grid wires for permitting or preventing the passage of electrons through gates defined by adjacent pairs of wires in accordance with the potential of said adjacent pairs, the wires of one network being at an angle with respect to the wires of the other network, and control means for applying opening voltages to adjacent pairs of wires in each network to open all of the gates of one network in space sequence while the first gate of the other network is also open, and repeating the sequence of the first network while the next adjacent gate of the second network is open and continuing until all gates have been opened in successive time and space sequence.

13. The combination as defined in claim 12, in which said control means includes a resistance matrix.

14. The combination as defined in claim 12, in which said control means includes a plurality of flip-flops interconnected for operation in a given time sequence.

15. In combination, an area selection tube having two groups of leads for making external connection to selected ones of a plurality of grid wires of a grid network, a plurality of devices adapted to be conditioned to represent a binary number, means responsive to the condition of said devices for applying a predetermined voltage to one lead of each group and a different voltage to all other leads of each group.

16. The combination as defined in claim 15, wherein one grid wire in each one of an adjacent pair of grid wires is connected to a lead in one of said two groups and the other grid wire in each one of said adjacent pair of grid wires is connected to a lead in the other of said two groups and the conditioning of said devices to represent a given binary number causes said predetermined voltage to be applied to one and only one adjacent pair of grid wires of said grid network.

JAN A. RAJCHMAN.

REFERENCES CITED

The following references are of record in the file of this patent:

UNITED STATES PATENTS

| Number | Name | Date |
|---|---|---|
| 1,946,223 | Mason | Feb. 6, 1934 |
| 2,399,429 | Edwards | Apr. 30, 1946 |
| 2,402,432 | Mumma | June 18, 1946 |